(12) United States Patent
Pollock

(10) Patent No.: US 10,314,439 B2
(45) Date of Patent: Jun. 11, 2019

(54) PORTABLE FOOD AND BEVERAGE CONTAINER

(71) Applicant: Double Decker Carry All, LLC, Salem, VA (US)

(72) Inventor: Christopher Pollock, Salem, VA (US)

(73) Assignee: DOUBLE DECKER CARRY ALL, LLC, Salem, VA (US)

( * ) Notice: Subject to any disclaimer, the term of this patent is extended or adjusted under 35 U.S.C. 154(b) by 270 days.

(21) Appl. No.: 14/992,722

(22) Filed: Jan. 11, 2016

(65) Prior Publication Data

US 2017/0196407 A1    Jul. 13, 2017

(51) Int. Cl.
*B65D 71/00* (2006.01)
*A47J 47/14* (2006.01)
*B65D 71/48* (2006.01)

(52) U.S. Cl.
CPC .............. *A47J 47/14* (2013.01); *B65D 71/48* (2013.01); *B65D 2571/00925* (2013.01)

(58) Field of Classification Search
USPC ....... 206/194, 196, 549, 546, 218, 217, 216, 206/199, 193; 229/902, 904, 103.2
See application file for complete search history.

(56) References Cited

U.S. PATENT DOCUMENTS

| | | | | |
|---|---|---|---|---|
| 2,074,477 A | * | 3/1937 | Kondolf | B65D 71/16 206/194 |
| 3,096,906 A | * | 7/1963 | Chidsey, Jr. | B65D 71/00 206/195 |
| 3,176,902 A | * | 4/1965 | Champlin | B65D 71/36 206/140 |
| 3,348,671 A | * | 10/1967 | Wood | B65D 71/12 206/140 |
| 3,640,380 A | | 2/1972 | Huffman | |
| 4,273,273 A | * | 6/1981 | Zenri | B65D 71/44 206/145 |
| 4,708,248 A | * | 11/1987 | Davis | A45C 11/20 206/548 |
| 5,267,644 A | * | 12/1993 | Tsao | B65D 71/48 206/151 |
| 5,427,242 A | * | 6/1995 | Oliff | B65D 71/36 206/160 |
| 5,682,984 A | * | 11/1997 | Hoell | B65D 71/36 206/161 |
| 5,803,264 A | | 9/1998 | Gersten et al. | |
| 5,816,411 A | * | 10/1998 | Smith | B65D 5/46096 206/218 |
| 5,957,276 A | | 9/1999 | Cutler et al. | |
| 5,984,086 A | * | 11/1999 | Foushee | B65D 71/16 206/147 |
| 6,068,114 A | * | 5/2000 | Zimmerman | B65D 71/16 206/216 |

(Continued)

FOREIGN PATENT DOCUMENTS

GB    2163949    *    8/1984

*Primary Examiner* — Jacob K Ackun
(74) *Attorney, Agent, or Firm* — Charles S. Sara; Elizabeth L. Neal; DeWitt LLP

(57) ABSTRACT

A food and beverage carrier for carrying food and beverages includes a container having a front panel having a window opening for food placement, a rear panel, fourth side panels, a top panel including a handle, and a bottom panel including at least one drink cup opening.

17 Claims, 4 Drawing Sheets

(56) References Cited

U.S. PATENT DOCUMENTS

| | | | |
|---|---|---|---|
| 6,183,027 B1* | 2/2001 | Tsao | B65D 71/48 |
| | | | 206/194 |
| 6,298,992 B1 | 10/2001 | Tsao | |
| 6,394,265 B1* | 5/2002 | Tsao | B65D 71/48 |
| | | | 206/217 |
| 6,401,927 B1* | 6/2002 | Sorensen | A47G 19/06 |
| | | | 206/216 |
| 6,422,454 B1* | 7/2002 | Barr | B65D 5/4204 |
| | | | 229/110 |
| 6,443,308 B1 | 9/2002 | Davis | |
| D575,637 S | 8/2008 | Adams | |
| 7,708,143 B2 | 5/2010 | Adams | |
| 2005/0029335 A1* | 2/2005 | Abernathy | B65D 5/2033 |
| | | | 229/122 |
| 2008/0217207 A1 | 9/2008 | Hall | |
| 2009/0230083 A1 | 9/2009 | Metcalfe et al. | |
| 2013/0306716 A1* | 11/2013 | Fogle | B65D 5/4204 |
| | | | 229/117.11 |

* cited by examiner

PORTABLE FOOD AND BEVERAGE CONTAINER

FIELD OF THE INVENTION

This invention relates to food containers in the form of cardboard, paper or plastic structures having interior food and beverage support trays.

BACKGROUND

The present invention is directed to the transportation of food and beverages during arena and stadium events, such as sporting events, concerts, and theatrical productions. An important part of these events is typically food. A common way to obtain the food is to go to a concession stand and purchase it there. Typically, the purchaser is given either the food itself, such as a hot dog and a drink cup or, if multiple items are purchased a tray may be provided. The tray sometimes includes slots for receiving drink cups and a central section for receiving food items. Carrying that tray back to the seat can be problematic as it typically requires two hands in order to prevent any spillage or loss. This creates a problem when the purchaser needs to navigate a crowded area and/or is responsible for other people such as young children. Very often, the purchaser wishes to hold the child's band in the crowd.

U.S. Pat. No. 3,640,380 to Huffman describes and illustrates a portable food and drink carrier. The carrier has cup-supporting flaps partially cut from a sidewall and hingedly connected to the wall. The carrier has a boxlike shape for containing food. A handle is also available for ease of carry.

U.S. Pat. No. 4,708,248 to Davis is directed to a collapsible food and beverage container which completely encloses both. The drink cups are first placed in the container in slots. A ledge or shelf is then placed upon the drink cups for placement of the food. Handles or gripping holds are also available for ease of carry.

U.S. Patent Publication 2009/0230083 to Metcalfe et al. is directed to a food and beverage carrier basically constructed of a fabric material. It includes openings for drink containers and a tray for carrying food and the like.

U.S. Pat. No. 5,803,264 to Gersten et al. and U.S. Pat. No. 6,443,308 to Davis illustrate and discuss similar food and beverage container carriers including a tray for carrying beverages. A similar food bearing tray can then be slipped over the central handle.

While these and other known carriers allow for the transportation of food and beverage cups with varying degrees of ease, they do have issues which affect their reliability. The primary issue deals with the transportation of the food and beverage without dropping or spilling the same and without the necessity to use both hands in the process.

SUMMARY OF THE INVENTION

The present invention is directed to a food and beverage carrier for carrying food and beverages, comprising a container having a first front panel, a second rear panel, third and fourth side panels, a fifth top panel, and a sixth bottom panel, wherein all said panels are connected to form a rectangular container, wherein the top panel comprises a handle, the bottom panel comprises at least one drink cup opening in the bottom panel for placement of a drink container, and the front panel comprises an opening for placement of food within the container.

The present invention is further directed to a food and beverage carrier for carrying food and beverages, comprising a container having a first front panel, a second rear panel, third and fourth side panels, a fifth top panel, a sixth bottom panel, a separate food tray for placement on the sixth bottom panel for receiving food, wherein all said panels are connected to form a rectangular container, wherein the top panel comprises a handle, wherein the handle comprises at least two openings for finger placement; the bottom panel comprises at least one drink cup opening in the bottom panel for placement of a drink container; the front panel comprises an opening for placement of food within the container; and each side panel comprises by two segment panels having a first edge connected to the container and a second edge, wherein the second edges of each segment panel meet in overlapping formation.

The present invention is further directed to a blank for forming a food and beverage carrier, the blank comprising a central panel having a bottom panel hingedly joined to a front panel by a fold line, wherein the bottom panel comprises at least one drink cup opening and a glue flap comprising adhesive for connecting the bottom panel to a rear panel, wherein the front panel is hingedly joined to a top panel by a fold line and the top panel is hingedly joined to the rear panel by a fold line, and wherein the front panel and the rear panel comprise side panel segments hingedly joined by fold lines; and a food tray panel removably joined to the rear panel by a score line.

The food and beverage carrier has several advantages over the prior art. The container provides a compact, inexpensive article for storing and carrying food and drink items. In addition, it can be folded for storage and transportation. When opened, provides a sturdy beverage and food carrier. Further, the structural integrity of the container assists in preventing crushing of the food. It is also compact allowing the user to carry food and beverage with one hand.

The objects and advantages of the invention will appear more fully from the following detailed description of the preferred embodiment of the invention made in conjunction with the accompanying drawings.

DETAILED DESCRIPTION OF THE INVENTION

The present invention is directed to a portable and packable drink and food container ideally meant for use in sporting venues and the like where speed, efficiency and safety of the product is required in adverse conditions such as in a crowd or when monitoring other individuals such as young children.

Figure 1:
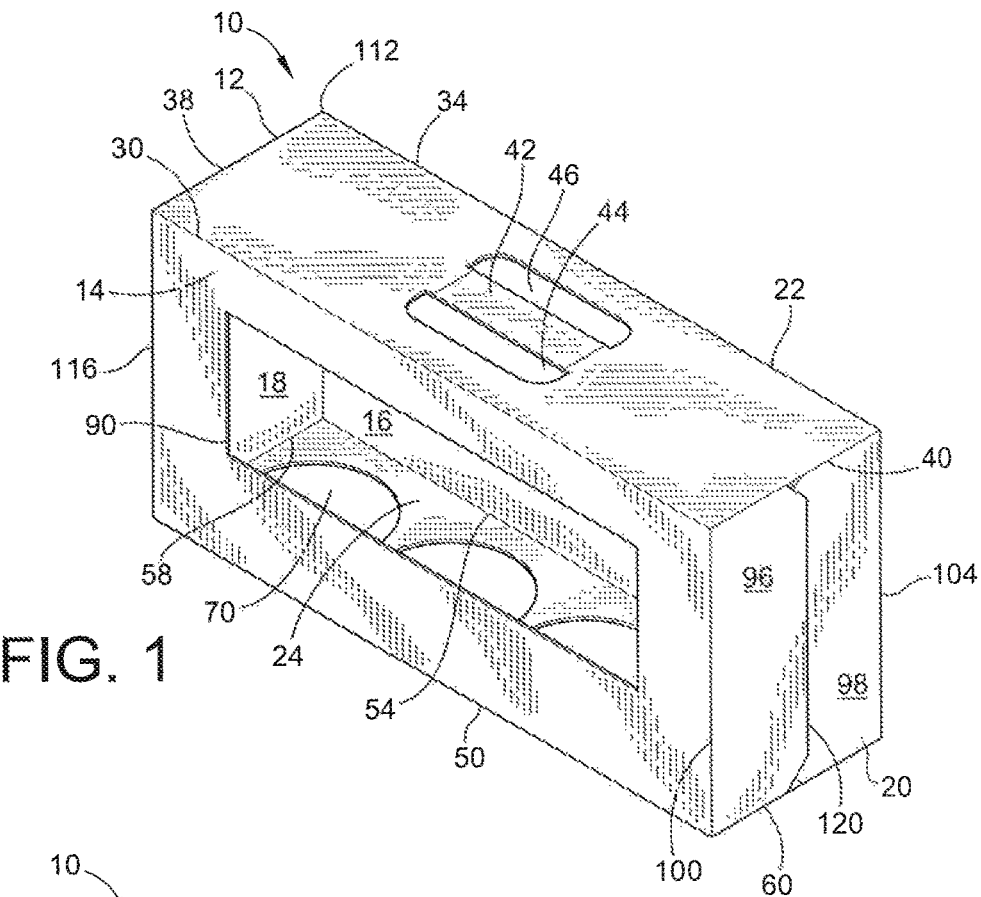
FIG. 1 is a perspective view of the food and beverage container of the present invention.

Referring to FIG. 1, the present invention is directed to a food and drink carrier 10 in the form of a rectangular shaped box or container 12 having a first front panel 14, a second rear panel 16, third and fourth side panels 18, 20, a top panel 22 and a bottom panel 24, all connected to form the rectangular container 12.

Top Panel 22:

The top panel 22 includes four linear edges. The first edge 30 is connected to the front panel 14 by a fold line 32. The second edge 34 is connected to the rear panel 16 by a fold line 36. The first side edge 38 is adjacent the first side panel 18, and the second side edge 40 is adjacent the second side panel 20. As will be described later with respect to the construction of the container 12, the first side edge 38 and the second side edge 40 are adjacent but not necessarily connected to the side panels 18, 20. The top panel 22 is defined by a handle 42 with two openings 44, 46 for finger placement. Although two openings 44, 46 are preferred, as illustrated, to form a grasping handle 42, it is within the scope of the present invention to include only one opening for placement of the carrier's fingers during transportation.

Bottom Panel 24:

Situated opposite the top panel 22 is the bottom panel 24 which is also the drink cup support surface. The bottom panel also includes four linear edges. The first edge 50 is connected to the front panel 14 by a fold line 52. The second edge 54 is connected to the rear panel 16 by a fold line 56. The first side edge 58 is adjacent the first side panel 18, and the second side edge 60 is adjacent the second side panel 20. Similarly to the top panel 12, the first side edge 58 and the second side edge 60 are adjacent but not necessarily connected to the side panels 18, 20.

Figure 3:
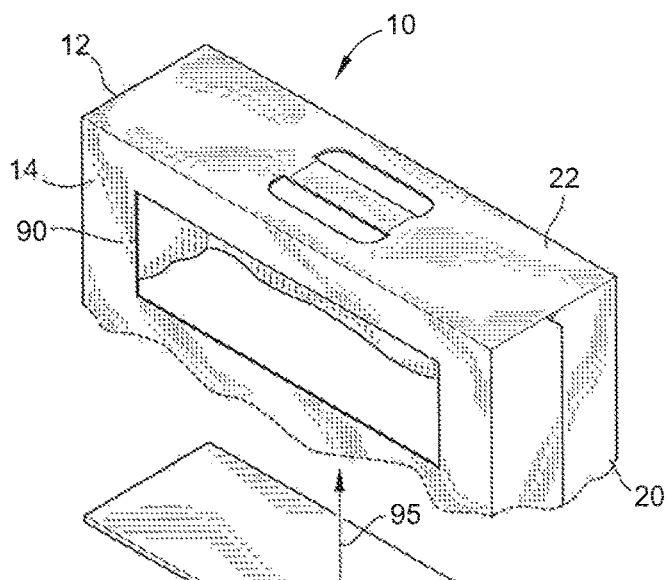
FIG. 3 is a perspective view of the food and beverage container of FIG. 2, illustrating the application of a food tray.
Figure 5:
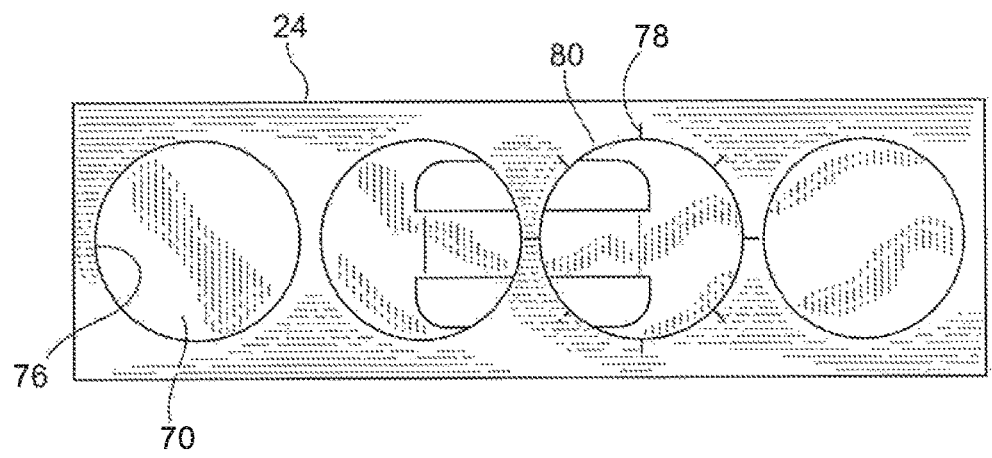
FIG. 5 is a bottom plan view of the food and beverage container of FIG. 1.

The bottom panel 24 is defined by one or more drink cup openings 70 for placement of drink containers, such as drink cups 72, illustrated in FIG. 3 with removable lids 74, during transportation. The openings 70 are preferably formed such that the peripheral area or edge 76 of the opening 70 has a circular shape as illustrated. However, the edge 76 of the opening 70 is not limited to circular shape. The diameter of the openings 70 can be variable depending on the particular needs of the situation and the diameter of the drink cups 72. However, it will be assumed that the diameter of the opening 70 is larger than the diameter of the bottom edge of most standard drink cups, yet smaller than the diameter of the top edge of the drink cup 72. In this manner, a drink cup 72 can be removably wedged into the circular opening 70 for transportation without sliding through the opening 70, as illustrated in FIG. 3. Depending on its diameter, the opening 70 will be able to support a variety of drink cups 72 having different sizes. As illustrated, the openings 70 are preferably intended to accommodate drink cups 72 wherein the bottom edge of the cup 72 has a diameter smaller than the top edge of the cup 72, as illustrated in FIG. 3, giving the cup 72 a conical shape. However, the openings 70 can also be adapted for other drinking vessels such as a can having parallel sides. In this manner, the diameter of the edge 76 should be slightly less that the diameter of a standard beverage can. However, the edge will be provided with at least one slit and preferably a plurality of slits or weakened areas 78 to provide deformable tabs 80, as illustrated in FIG. 5. When a beverage can is inserted into the opening 70, the tabs 80 will deform downwardly to frictionally receive the can. In the manner, the can will be removably secured within the opening 70 until physically removed.

While four openings 70 are shown in the drawings, it is within the scope of the present invention to have more or fewer openings 70 as desired.

Figure 4:
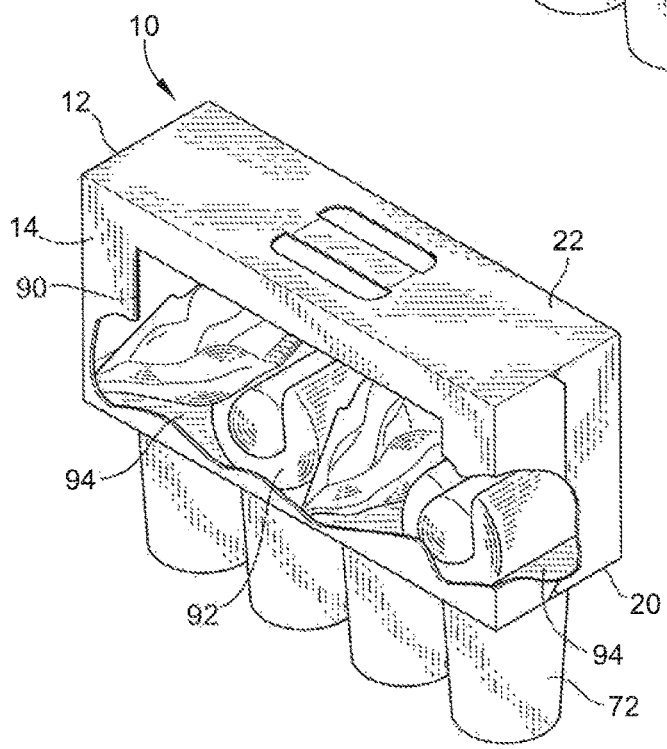
FIG. 4 is a perspective view of the food and beverage container of FIG. 2, illustrating the container with food and drink containers.

Front Panel 14:

The front panel 14 is defined by a window or opening 90 for easy placement and removal of food, e.g., hot dogs, chips, etc. illustrated at 92 in FIG. 4. The dimensions on the window 90 are variable as long as the window 90 can serve the purpose of storing food 92 during transportation. If desired, a removable food tray 94, a flat panel generally the same dimension as the bottom panel 24, will be placed on top of the drink cups 72, according to arrows 95, in FIG. 3. The food 92 can then be stored on the food tray 94 during transportation. The food tray 94 can be made of paper, cardboard, plastic or the like.

Figure 2:
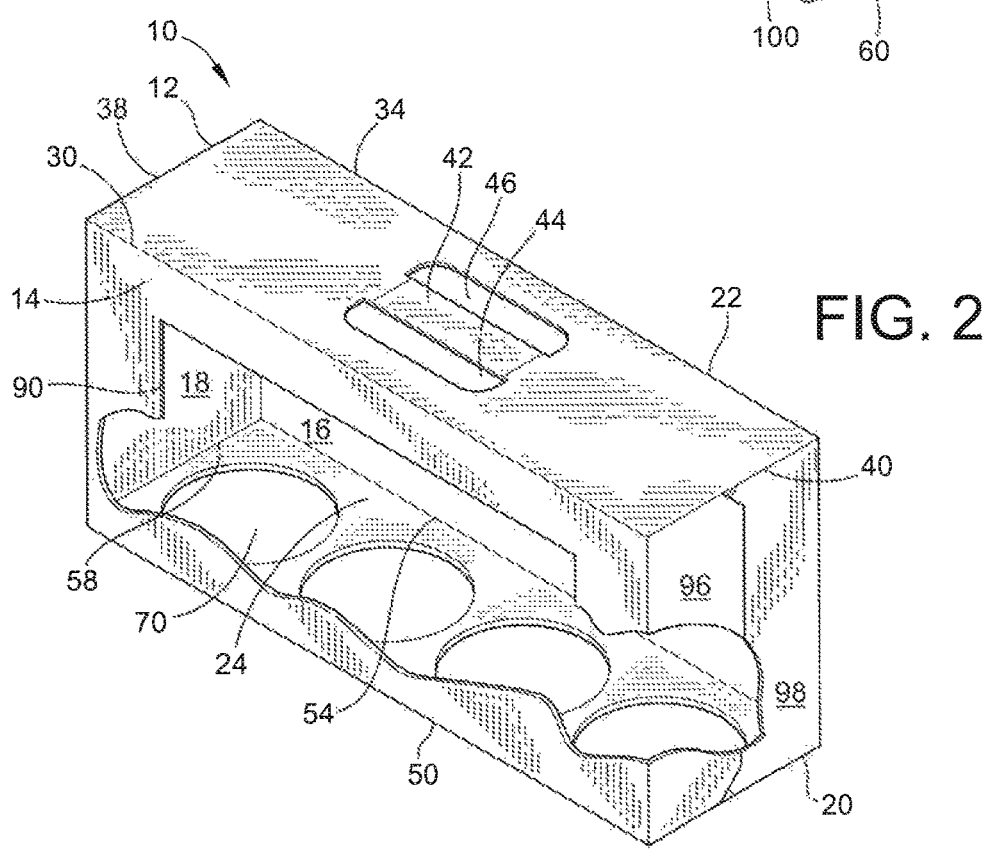
FIG. 2 is a perspective view of the food and beverage container of FIG. 1, illustrating part of the container in cut-away view.
Figure 6:
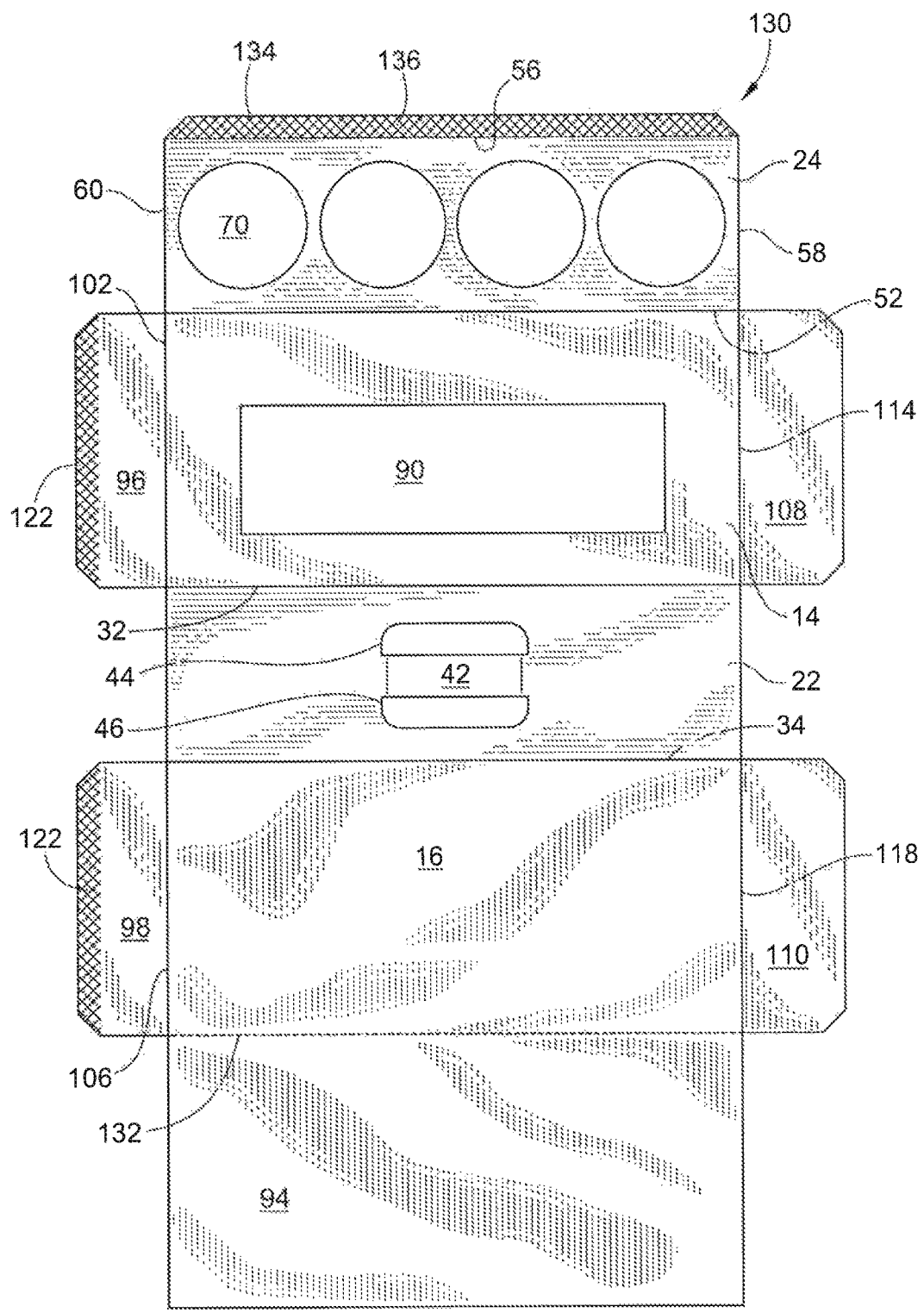
FIG. 6 is a top plan view of a blank for constructing the food and beverage container of FIG. 1.

Side Panels 18, 20:

As illustrated in FIGS. 1 and 2, side panel 20 is defined by two segment panels 96, 98. Segment panel 96 is connected to the front panel 14 at edge 100 by fold line 102. Segment panel 98 is connected to the rear panel 16 at edge 104 by fold line 106. Similarly, although not shown in FIGS. 1 and 2, side panel 18 is defined by two segment panels 108, 110. Reference is made to FIG. 6 for segment panels 108, 110. Segment panel 108 is connected to the front panel 14 at edge 112 by fold line 114. Segment panel 110 is connected to the rear panel 16 at edge 116 by fold line 118. Each of segment panels 96, 98 and 108, 110 meet in a preferably centrally vertical seam in which one of the segments overlaps the other. While the seam is not illustrated with respect to side panel 18, reference is made to seam 120, which illustrates the segment panel 96 overlaps segment panel 98 at the juncture of the seam 120. An identical overlap is made with respect to segment panels 108, 110 in side panel 18. The segment panels can be permanently adhered at the same location by an adhesive 122, illustrated in FIG. 6, such as glue or tape. Alternatively, the segment panels can be temporarily adhered by clips, Velcro attachments or the like. If the container 12 includes a temporary adhesion factor, the container 12 can be easily opened and folded for transportation and storage. There are a number of different types of conventional fastening devices which can be used as the fastener, for example, hook and loop fasteners, such as VELCRO, buttons, or snaps. In a preferred embodiment, adhesive backed hook and loop fasteners are used, wherein one of the hook and loop parts is fixed to one segment panel and the other meeting hook and loop part is fixed to the other segment panel at the location of the overlapping seam 120. The segment panels can also be interlocked by means of matching slits in the segment panels with an arm from one segment overlapping an opposing arm from an opposite segment (not illustrated).

If desired, indicia such as advertisement or designs can be placed on the panels of the container.

The Blank:

FIG. 6 illustrates one embodiment of a blank 130 that may be used in the present invention. As illustrated, it can be formed from one sheet or panel of corrugated fiberboard, plastic, cardboard or other sheet material as long as the material possesses a certain rigidity or stiffness to enable the basic shape of the container. The blank is cut and marked with fold lines and score lines for ease in assembly of the carrier container 12.

The blank 130 includes a bottom panel 24 hingedly joined to the front panel 14 by fold line 52. The front panel 14 is hingedly joined to the top panel 22 by fold line 32. The top panel 22 is hingedly joined to the rear panel 16 by fold line 36.

If desired, the food tray 94 can be removably joined to the rear panel 16 at score line 132. Whereas a fold line is a depression area in the blank 130 intended assist in folding the blank along a desired edge but not separating one segment of the blank 130 from the rest of the blank, a score line is a punched line in the blank leaving alternating openings along the score line to enable the easy separation of a segment, such as the food tray 94.

Situated opposite fold line 56 of the bottom panel 24 is a glue flap 134. The glue flap includes an adhesive 136 to connect the bottom panel to edge of the rear panel 16 adjacent the score line 132 when the food tray 94 is removed.

Situated at either side of the front panel 14 are side panel segments 96 and 108. Panel segment 96 is hingedly joined to front panel 14 by fold line 102. Likewise, panel segment 108 is joined to front panel 14 by fold line 114.

To prepare the container 12, the food tray 94, if present, is removed along the score line 132. The rear panel 16 and the front panel 14 are bent along fold lines 36 and 32 respectively to place the panels 14, 16 at 90 degree angles with respect to the top panel 22. The bottom panel 24 is then folded at fold line 52 such that the glue flap 134 overlaps (or underlaps if desired) the score line edge 132 of the rear panel 16. The adhesive 136 is urged against the back panel 16 to seal the bottom panel 24 to the back panel 16. Panel segments 108 and 110 are then folded inwardly at an approximate 90 degree angle along fold lines 114 and 118 respectively such that the panel segment edges are placed against the top panel 22 and the bottom panel 24. Likewise, panel segments 96 and 98 are folded inwardly at an approximate 90 degree angle along fold lines 102 and 106 respectively such that the panel segment edges are placed against the top panel 22 and the bottom panel 24 such that the panel segments 96 and 98 slightly overlap panel segments 108 and 110 respectively. The adhesive 122 on panel segments 96 and 98 will then come in contact with the outer surfaces of panel segments 108 and 110 to form the side panels 18 and 20, thereby forming a rectangular-shaped container 12. At this point the container 12 is ready for use.

In Use:

The drink cups 72 ordered by the customer can now be placed in drink cup openings 70 so that they rest on bottom panel 24 of the container 12 as illustrated in FIG. 3. In this manner, the drink cups 72 will be held in upright position by the drink cup openings 70. After the drink cups 72 have been disposed as hereinabove described, food support tray 94 can be grasped and placed over the tops of the drink cups 72 to form a support tray for food 92 as illustrated in FIG. 4. The food 92 the customer has ordered can then be placed on the food tray 94 and will be separated and isolated from the drink cups 72 thereunder.

Any version of any component or method step of the invention may be used with any other component or method step of the invention. The elements described herein can be used in any combination whether explicitly described or not.

All combinations of method steps as used herein can be performed in any order, unless otherwise specified or clearly implied to the contrary by the context in which the referenced combination is made.

As used herein, the singular forms "a," an, and "the" include plural referents unless the content clearly dictates otherwise.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All patents, patent publications, and peer-reviewed publications (i.e., "references") cited herein are expressly incorporated by reference in their entirety to the same extent as if each individual reference were specifically and individually indicated as being incorporated by reference. In case of conflict between the present disclosure and the incorporated references, the present disclosure controls.

The devices, methods, compounds and compositions of the present invention can comprise, consist of, or consist essentially of the essential elements and limitations described herein, as well as any additional or optional steps, ingredients, components, or limitations described herein or otherwise useful in the art.

While this invention may be embodied in many forms, what is described in detail herein is a specific preferred embodiment of the invention. The present disclosure is an exemplification of the principles of the invention is not intended to limit the invention to the particular embodiments illustrated. It is to be understood that this invention is not limited to the particular examples, process steps, and materials disclosed herein as such process steps and materials may vary somewhat. It is also understood that the terminology used herein is used for the purpose of describing particular embodiments only and is not intended to be limiting since the scope of the present invention will be limited to only the appended claims and equivalents thereof.

What is claimed is:

1. A food and beverage carrier for carrying food and beverages, comprising a container having a first front panel, a second rear panel, third and fourth side panels, a fifth top panel, and a sixth bottom panel, wherein all said panels are connected to form a rectangular container, wherein:
   the top panel comprises a handle, the handle coplanar with the top panel, at least one opening adjacent to the handle and extending through the top panel;
   the bottom panel comprises at least one drink cup opening in the bottom panel for placement of a drink container; and
   the front panel comprises an opening for placement of food within the container, the second rear panel opposite the opening for placement of food being a solid panel without openings.

2. The carrier of claim 1 wherein the top panel includes at least one opening for finger placement.

3. The carrier of claim 1 wherein the top panel includes at least two openings for finger placement.

4. The carrier of claim 1 wherein the bottom panel includes at least two drink cup openings.

5. The carrier of claim 1 wherein the bottom panel includes at least four drink cup openings.

6. The carrier of claim 1 wherein the drink cup opening comprises a plurality of slits forming deformable tabs.

7. The carrier of claim 1 comprising a food tray for placement on the drink container for receiving the food for transportation.

8. The carrier of claim 1 wherein each side panel comprises by two segment panels having a first edge connected to the container and a second edge, wherein the second edges of each segment panel meet in overlapping formation.

9. The carrier of claim 8 wherein the second edges of each segment panel are permanently adhered together.

10. The carrier of claim 8 wherein the second edges of each segment panel are temporarily adhered together.

11. The carrier of claim 1 wherein panels include indicia.

12. A food and beverage carrier for carrying food and beverages, comprising a container having a first front panel, a second rear panel, third and fourth side panels, a fifth top panel, a sixth bottom panel, a separate food tray for placement on the sixth bottom panel for receiving food, wherein all said panels are connected to form a rectangular container, wherein:

the top panel comprises a handle, the handle coplanar with the top panel, wherein the top panel comprises at least two openings for finger placement, the at least two openings adjacent to the handle and extending through the top panel;

the bottom panel comprises at least one drink cup opening in the bottom panel for placement of a drink container;

the front panel comprises an opening for placement of food within the container, the second rear panel opposite the opening for placement of food being a solid panel without openings; and each side panel comprises by two segment panels having a first edge connected to the container and a second edge, wherein the second edges of each segment panel meet in overlapping formation.

13. The carrier of claim 12 wherein the bottom panel includes at least four drink cup openings.

14. The carrier of claim 12 wherein the drink cup opening comprises a plurality of slits forming deformable tabs.

15. The carrier of claim 12 wherein the second edges of each segment panel are permanently adhered together.

16. The carrier of claim 12 wherein the second edges of each segment panel are temporarily adhered together.

17. The carrier of claim 12 wherein panels include indicia.

\* \* \* \* \*